United States Patent
Richert

(10) Patent No.: US 10,194,163 B2
(45) Date of Patent: Jan. 29, 2019

(54) APPARATUS AND METHODS FOR REAL TIME ESTIMATION OF DIFFERENTIAL MOTION IN LIVE VIDEO

(71) Applicant: Brain Corporation, San Diego, CA (US)

(72) Inventor: Micah Richert, San Diego, CA (US)

(73) Assignee: Brain Corporation, San Diego, CA (US)

(*) Notice: Subject to any disclaimer, the term of this patent is extended or adjusted under 35 U.S.C. 154(b) by 680 days.

(21) Appl. No.: 14/285,385

(22) Filed: May 22, 2014

(65) Prior Publication Data

US 2015/0341633 A1    Nov. 26, 2015

(51) Int. Cl.
*H04N 19/50* (2014.01)
*G06T 7/215* (2017.01)
(Continued)

(52) U.S. Cl.
CPC ............. *H04N 19/50* (2014.11); *G06T 7/215* (2017.01); *G06T 2207/10016* (2013.01);
(Continued)

(58) Field of Classification Search
CPC . G06T 2207/10016; G06T 2207/30261; G06T 7/2006; G06T 7/20; G06T 7/207;
(Continued)

(56) References Cited

U.S. PATENT DOCUMENTS 5,063,603 A * 11/1991 Burt .................. G06K 9/00255
                                                    382/115
5,138,447 A    8/1992 Shen et al.
(Continued)

FOREIGN PATENT DOCUMENTS

CN    102226740 A    10/2011
JP    H0487423 A    3/1992
(Continued)

OTHER PUBLICATIONS

Berkes and Wiskott. Slow feature analysis yields a rich repertoire of complex cell properties. Journal of Vision (2005) vol. 5 (6).
Bohte, 'Spiking Nueral Networks' Doctorate at the University of Leiden, Holland, Mar. 5, 2003, pp. 1-133 [retrieved on Nov. 14, 2012]. Retrieved from the interne <a href="http://homepages.cwi.nl/~sbohte/publication/phdthesis.pdf">http://homepages.cwi.nl/~sbohte/publication/phdthesis.pdf</a><url: />.
Brette et al., Brian: a simple and flexible simulator for spiking neural networks, The Neuromorphic Engineer, Jul. 1, 2009, pp. 1-4, doi: 10.2417/1200906.1659.

(Continued)

*Primary Examiner* — Christopher S Kelley
*Assistant Examiner* — Kathleen M Walsh
(74) *Attorney, Agent, or Firm* — Reed Smith LLP; Sidharth Kapoor

(57) ABSTRACT

A data processing apparatus may use a video encoder in order to extract motion information from streaming video in real time. Output of the video encoder may be parsed in order to extract motion information associated with one or more objects within the video stream. Motion information may be utilized by e.g., an adaptive controller in order to detect one or more objects salient to a given task. The controller may be configured to determine a control signal associated with the given task. The control signal determination may be configured based on a characteristic of an object detected using motion information extracted from the encoded output. The control signal may be provided to a robotic device causing the device to execute the task. The use of dedicated hardware video encoder output may reduce energy consumption associated with execution of the task and/or extend autonomy of the robotic device.

23 Claims, 6 Drawing Sheets

(51) Int. Cl.
*H04N 19/51* (2014.01)
*H04N 19/52* (2014.01)

(52) U.S. Cl.
CPC .... *G06T 2207/30261* (2013.01); *H04N 19/51* (2014.11); *H04N 19/52* (2014.11)

(58) Field of Classification Search
CPC ......... G06T 7/215; G06T 7/223; G06T 7/231; G06T 7/238; G06T 7/246; G06T 7/248; G06T 7/251; G06T 7/254; G06T 7/262; G06T 7/269; G06T 7/277; G06T 7/285; G06T 7/292; H04N 19/51; H04N 19/52; H04N 19/00696; H04N 19/00787; H04N 19/50; H04N 19/513; H04N 19/55; H04N 19/553; H04N 19/56; G01S 3/7865; G06F 3/013; G08B 13/19606; G08B 13/19608
USPC ...................................... 375/240.16; 348/169
See application file for complete search history.

(56) References Cited

U.S. PATENT DOCUMENTS

| | | | |
|---|---|---|---|
| 5,216,752 A | 6/1993 | Tam | |
| 5,272,535 A | 12/1993 | Elabd | |
| 5,355,435 A | 10/1994 | Deyong et al. | |
| 5,638,359 A | 6/1997 | Peltola et al. | |
| 5,673,367 A | 9/1997 | Buckley | |
| 5,875,108 A | 2/1999 | Hoffberg et al. | |
| 6,009,418 A | 12/1999 | Cooper | |
| 6,014,653 A | 1/2000 | Thaler | |
| 6,035,389 A | 3/2000 | Grochowski et al. | |
| 6,359,601 B1 | 3/2002 | Maguire, Jr. | |
| 6,418,424 B1 | 7/2002 | Hoffberg et al. | |
| 6,458,157 B1 | 10/2002 | Suaning | |
| 6,501,515 B1* | 12/2002 | Iwamura | G08C 23/00 345/157 |
| 6,501,794 B1* | 12/2002 | Wang | H04N 19/17 348/699 |
| 6,509,854 B1 | 1/2003 | Morita et al. | |
| 6,545,705 B1 | 4/2003 | Sigel et al. | |
| 6,545,708 B1 | 4/2003 | Tamayama et al. | |
| 6,546,291 B2 | 4/2003 | Merfeld et al. | |
| 6,556,610 B1 | 4/2003 | Jiang et al. | |
| 6,581,046 B1 | 6/2003 | Ahissar | |
| 6,625,317 B1 | 9/2003 | Gaffin et al. | |
| 6,678,590 B1* | 1/2004 | Burchfiel | G05D 1/0253 348/116 |
| 7,016,783 B2 | 3/2006 | Hac et al. | |
| 7,113,867 B1 | 9/2006 | Stein | |
| 7,142,602 B2* | 11/2006 | Porikli | G06K 9/34 375/240.16 |
| 7,430,682 B2 | 9/2008 | Carlson et al. | |
| 7,447,337 B2* | 11/2008 | Zhang | G06K 9/00711 348/699 |
| 7,580,907 B1 | 8/2009 | Rhodes | |
| 7,653,255 B2 | 1/2010 | Rastogi | |
| 7,737,933 B2 | 6/2010 | Yamano et al. | |
| 7,809,197 B2 | 10/2010 | Fedorovskaya et al. | |
| 7,849,030 B2 | 12/2010 | Ellingsworth | |
| 8,000,967 B2 | 8/2011 | Taleb | |
| 8,015,130 B2 | 9/2011 | Matsugu et al. | |
| 8,103,602 B2 | 1/2012 | Izhikevich | |
| 8,108,147 B1 | 1/2012 | Blackburn | |
| 8,160,354 B2 | 4/2012 | Paquier | |
| 8,200,593 B2 | 6/2012 | Guillen et al. | |
| 8,311,965 B2 | 11/2012 | Breitwisch et al. | |
| 8,315,305 B2 | 11/2012 | Petre et al. | |
| 8,390,707 B2 | 3/2013 | Yamashita | |
| 8,396,249 B1 | 3/2013 | Khosla et al. | |
| 8,396,282 B1 | 3/2013 | Huber et al. | |
| 8,416,847 B2 | 4/2013 | Roman | |
| 8,467,623 B2 | 6/2013 | Izhikevich et al. | |
| 8,542,875 B2 | 9/2013 | Eswara | |
| 8,712,939 B2 | 4/2014 | Szatmary et al. | |
| 9,070,285 B1 | 6/2015 | Ramu et al. | |
| 9,150,220 B2 | 10/2015 | Clarke et al. | |
| 9,713,982 B2 | 7/2017 | Buibas et al. | |
| 2002/0038294 A1 | 3/2002 | Matsugu | |
| 2002/0176025 A1* | 11/2002 | Kim | H03M 7/30 348/699 |
| 2003/0050903 A1 | 3/2003 | Liaw et al. | |
| 2003/0216919 A1 | 11/2003 | Roushar | |
| 2004/0054964 A1 | 3/2004 | Bozdagi et al. | |
| 2004/0136439 A1 | 7/2004 | Dewberry et al. | |
| 2004/0170330 A1 | 9/2004 | Fogg et al. | |
| 2004/0193670 A1 | 9/2004 | Langan et al. | |
| 2004/0233987 A1* | 11/2004 | Porikli | G06K 9/34 375/240.16 |
| 2005/0015351 A1 | 1/2005 | Nugent | |
| 2005/0036649 A1* | 2/2005 | Yokono | G06K 9/00221 382/100 |
| 2005/0047647 A1 | 3/2005 | Rutishauser et al. | |
| 2005/0062846 A1 | 3/2005 | Choi et al. | |
| 2005/0096539 A1 | 5/2005 | Leibig et al. | |
| 2005/0283450 A1 | 12/2005 | Matsugu et al. | |
| 2006/0008144 A1 | 1/2006 | Prasad et al. | |
| 2006/0088191 A1* | 4/2006 | Zhang | G06K 9/00711 382/107 |
| 2006/0094001 A1 | 5/2006 | Torre et al. | |
| 2006/0127042 A1 | 6/2006 | Park et al. | |
| 2006/0129728 A1 | 6/2006 | Hampel | |
| 2006/0161218 A1 | 7/2006 | Danilov | |
| 2006/0188168 A1 | 8/2006 | Sheraizin et al. | |
| 2006/0285724 A1 | 12/2006 | Tian | |
| 2007/0003130 A1 | 1/2007 | Goerick et al. | |
| 2007/0022068 A1 | 1/2007 | Linsker | |
| 2007/0071100 A1* | 3/2007 | Shi | H04N 7/0137 375/240.16 |
| 2007/0109409 A1 | 5/2007 | Yea et al. | |
| 2007/0176643 A1 | 8/2007 | Nugent | |
| 2007/0208678 A1 | 9/2007 | Matsugu | |
| 2008/0043848 A1* | 2/2008 | Kuhn | G06F 17/30811 375/240.16 |
| 2008/0100482 A1 | 5/2008 | Lazar | |
| 2008/0152236 A1 | 6/2008 | Vendrig et al. | |
| 2008/0174700 A1 | 7/2008 | Takaba | |
| 2008/0199072 A1 | 8/2008 | Kondo et al. | |
| 2008/0205764 A1* | 8/2008 | Iwai | G06K 9/50 382/190 |
| 2008/0237446 A1 | 10/2008 | Oshikubo et al. | |
| 2008/0252723 A1* | 10/2008 | Park | G06K 9/00771 348/143 |
| 2008/0267458 A1 | 10/2008 | Laganiere et al. | |
| 2009/0018696 A1 | 1/2009 | Goerick et al. | |
| 2009/0028384 A1 | 1/2009 | Bovyrin et al. | |
| 2009/0043722 A1 | 2/2009 | Nugent | |
| 2009/0096863 A1 | 4/2009 | Kim et al. | |
| 2009/0096927 A1* | 4/2009 | Camp, Jr. | G06K 9/3241 348/613 |
| 2009/0106030 A1 | 4/2009 | Den et al. | |
| 2009/0141938 A1* | 6/2009 | Lim | G06K 9/00664 382/103 |
| 2009/0195640 A1 | 8/2009 | Kim et al. | |
| 2009/0202114 A1 | 8/2009 | Morin et al. | |
| 2009/0287624 A1 | 11/2009 | Rouat et al. | |
| 2009/0304231 A1 | 12/2009 | Lu et al. | |
| 2009/0312985 A1 | 12/2009 | Eliazar | |
| 2009/0323809 A1* | 12/2009 | Raveendran | H04N 19/46 375/240.16 |
| 2010/0036457 A1 | 2/2010 | Sarpeshkar et al. | |
| 2010/0073371 A1 | 3/2010 | Ernst et al. | |
| 2010/0080297 A1* | 4/2010 | Wang | H04N 19/00696 375/240.16 |
| 2010/0081958 A1 | 4/2010 | She | |
| 2010/0086171 A1 | 4/2010 | Lapstun | |
| 2010/0100482 A1 | 4/2010 | Hardt | |
| 2010/0166320 A1 | 7/2010 | Paquier | |
| 2010/0225824 A1 | 9/2010 | Lazar et al. | |
| 2010/0235310 A1 | 9/2010 | Gage et al. | |
| 2010/0271511 A1 | 10/2010 | Ma et al. | |

(56) References Cited

U.S. PATENT DOCUMENTS

| | | | |
|---|---|---|---|
| 2010/0290530 A1* | 11/2010 | Huang | H04N 19/139 375/240.16 |
| 2010/0299296 A1 | 11/2010 | Modha et al. | |
| 2011/0002191 A1 | 1/2011 | Demaio et al. | |
| 2011/0016071 A1 | 1/2011 | Guillen et al. | |
| 2011/0063409 A1 | 3/2011 | Hannuksela | |
| 2011/0103480 A1* | 5/2011 | Dane | H04N 19/513 375/240.16 |
| 2011/0119214 A1 | 5/2011 | Breitwisch et al. | |
| 2011/0119215 A1 | 5/2011 | Elmegreen et al. | |
| 2011/0134242 A1* | 6/2011 | Loubser | G06K 9/00771 348/143 |
| 2011/0137843 A1 | 6/2011 | Poon et al. | |
| 2011/0160741 A1 | 6/2011 | Asano et al. | |
| 2011/0170792 A1 | 7/2011 | Tourapis et al. | |
| 2011/0206122 A1* | 8/2011 | Lu | H04N 19/172 375/240.13 |
| 2011/0222603 A1* | 9/2011 | Le Barz | H04N 21/23412 375/240.16 |
| 2011/0228092 A1* | 9/2011 | Park | G06K 9/00771 348/154 |
| 2011/0242341 A1 | 10/2011 | Agrawal et al. | |
| 2011/0280300 A1 | 11/2011 | Tourapis et al. | |
| 2012/0011090 A1 | 1/2012 | Tang et al. | |
| 2012/0026304 A1 | 2/2012 | Kawahara | |
| 2012/0057634 A1* | 3/2012 | Shi | H04N 19/52 375/240.16 |
| 2012/0072189 A1 | 3/2012 | Bullen et al. | |
| 2012/0083982 A1* | 4/2012 | Bonefas | G05D 1/0223 701/70 |
| 2012/0084240 A1 | 4/2012 | Esser et al. | |
| 2012/0093402 A1 | 4/2012 | Staelin et al. | |
| 2012/0109866 A1 | 5/2012 | Modha | |
| 2012/0130566 A1 | 5/2012 | Anderson et al. | |
| 2012/0140032 A1 | 6/2012 | Tabor | |
| 2012/0162450 A1* | 6/2012 | Park | H04N 5/145 348/208.4 |
| 2012/0212579 A1 | 8/2012 | Frojdh et al. | |
| 2012/0230580 A1 | 9/2012 | Knee | |
| 2012/0236114 A1 | 9/2012 | Chang et al. | |
| 2012/0243733 A1 | 9/2012 | Sawai | |
| 2012/0256941 A1 | 10/2012 | Ballestad et al. | |
| 2012/0294486 A1 | 11/2012 | Diggins et al. | |
| 2012/0294546 A1 | 11/2012 | Sakamoto et al. | |
| 2012/0303091 A1 | 11/2012 | Izhikevich | |
| 2012/0308076 A1 | 12/2012 | Piekniewski et al. | |
| 2012/0308136 A1 | 12/2012 | Izhikevich | |
| 2012/0330447 A1 | 12/2012 | Gerlach et al. | |
| 2013/0019024 A1 | 1/2013 | Sheth et al. | |
| 2013/0022111 A1 | 1/2013 | Chen et al. | |
| 2013/0050574 A1* | 2/2013 | Lu | G06K 9/4671 348/441 |
| 2013/0051680 A1* | 2/2013 | Kono | G06T 7/0081 382/195 |
| 2013/0073484 A1 | 3/2013 | Izhikevich et al. | |
| 2013/0073491 A1 | 3/2013 | Izhikevich et al. | |
| 2013/0073492 A1 | 3/2013 | Izhikevich et al. | |
| 2013/0073495 A1 | 3/2013 | Izhikevich et al. | |
| 2013/0073496 A1 | 3/2013 | Szatmary et al. | |
| 2013/0073498 A1 | 3/2013 | Izhikevich et al. | |
| 2013/0073499 A1 | 3/2013 | Izhikevich et al. | |
| 2013/0073500 A1 | 3/2013 | Szatmary et al. | |
| 2013/0147915 A1 | 6/2013 | Wiegand et al. | |
| 2013/0148882 A1 | 6/2013 | Lee | |
| 2013/0151450 A1 | 6/2013 | Ponulak | |
| 2013/0176430 A1 | 7/2013 | Zhu et al. | |
| 2013/0218821 A1 | 8/2013 | Szatmary et al. | |
| 2013/0222534 A1 | 8/2013 | Rusanovskyy et al. | |
| 2013/0226532 A1 | 8/2013 | Ben et al. | |
| 2013/0251278 A1 | 9/2013 | Izhikevich et al. | |
| 2013/0297539 A1 | 11/2013 | Piekniewski et al. | |
| 2013/0297541 A1 | 11/2013 | Piekniewski et al. | |
| 2013/0297542 A1 | 11/2013 | Piekniewski et al. | |
| 2013/0325766 A1 | 12/2013 | Petre et al. | |
| 2013/0325768 A1 | 12/2013 | Sinyavskiy et al. | |
| 2013/0325773 A1 | 12/2013 | Sinyavskiy et al. | |
| 2013/0325774 A1 | 12/2013 | Sinyavskiy et al. | |
| 2013/0325775 A1 | 12/2013 | Sinyavskiy et al. | |
| 2013/0325777 A1 | 12/2013 | Petre et al. | |
| 2013/0343610 A1 | 12/2013 | Dal et al. | |
| 2014/0003711 A1 | 1/2014 | Ngan et al. | |
| 2014/0012788 A1 | 1/2014 | Piekniewski | |
| 2014/0016858 A1 | 1/2014 | Richert | |
| 2014/0028793 A1 | 1/2014 | Wiegand et al. | |
| 2014/0032458 A1 | 1/2014 | Sinyavskiy et al. | |
| 2014/0032459 A1 | 1/2014 | Sinyavskiy et al. | |
| 2014/0052679 A1 | 2/2014 | Sinyavskiy et al. | |
| 2014/0064609 A1 | 3/2014 | Petre et al. | |
| 2014/0085507 A1 | 3/2014 | Pillman et al. | |
| 2014/0086486 A1 | 3/2014 | Pillman et al. | |
| 2014/0119654 A1 | 5/2014 | Taylor et al. | |
| 2014/0122397 A1 | 5/2014 | Richert et al. | |
| 2014/0122398 A1 | 5/2014 | Richert | |
| 2014/0122399 A1 | 5/2014 | Szatmary et al. | |
| 2014/0124004 A1 | 5/2014 | Rosenstein et al. | |
| 2014/0156574 A1 | 6/2014 | Piekniewski et al. | |
| 2014/0201126 A1 | 7/2014 | Zadeh et al. | |
| 2014/0241612 A1 | 8/2014 | Rhemann et al. | |
| 2014/0328405 A1 | 11/2014 | Shen et al. | |
| 2014/0379179 A1 | 12/2014 | Goossen et al. | |
| 2015/0077639 A1 | 3/2015 | Chamaret et al. | |
| 2015/0127154 A1 | 5/2015 | Passot et al. | |
| 2015/0127155 A1 | 5/2015 | Passot et al. | |
| 2015/0181168 A1 | 6/2015 | Pahalawatta et al. | |
| 2015/0217449 A1 | 8/2015 | Meier et al. | |
| 2015/0269439 A1 | 9/2015 | Versace et al. | |
| 2015/0281715 A1* | 10/2015 | Lawrence | H04N 19/44 375/240.16 |
| 2015/0304634 A1 | 10/2015 | Karvounis | |
| 2015/0304640 A1 | 10/2015 | Brooks | |
| 2015/0312547 A1 | 10/2015 | Cucca | |
| 2016/0003946 A1 | 1/2016 | Gilliland et al. | |
| 2016/0007043 A1 | 1/2016 | Heo et al. | |
| 2016/0009413 A1 | 1/2016 | Lee et al. | |
| 2016/0165209 A1 | 6/2016 | Huang et al. | |
| 2016/0182884 A1 | 6/2016 | Lin et al. | |

FOREIGN PATENT DOCUMENTS

| | | |
|---|---|---|
| RU | 2108612 C1 | 4/1998 |
| RU | 2406105 C2 | 12/2010 |
| RU | 2424561 C2 | 7/2011 |
| WO | WO-2008083335 A2 | 7/2008 |
| WO | WO-2008132066 A1 | 11/2008 |

OTHER PUBLICATIONS

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):p. 80.

Dorval et al. 'Probability distributions of the logarithm of interspike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Field, G.; Chichilnisky, E, Information Processing in the Primate Retina: Circuitry and Coding. Annual Review of Neuroscience, 2007, 30(1), 1-30.

(56) References Cited

OTHER PUBLICATIONS

Fiete, et al, Spike-Time-Dependent Plasticity and Heterosynaptic Competition Organize Networks to Produce Long Scale-Free Sequences of Neural Activity. Neuron 65, Feb. 25, 2010, pp. 563-576.
Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.
Florian (2003), Biologically Inspired Neural Networks for the Control of Embodied Agents, Technical Report Coneural-03-03 Version 1.0 [online], Nov. 30, 2003 [retrieved on Nov. 24, 2014]. Retrieved from the Internet: <url:http: download?doi="10.1.1.216.4931-"&rep1&type="pdf"></url:http:>.
Foldiak, P. Learning invariance from transformation sequences. Neural Computation, 1991, 3(2), 194-200.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.
Gerstner et al. (1996) A neuronal learning rule for sub-millisecond temporal coding. Nature vol. 383 (6595) pp. 76-78.
Gewaltig et al.. 'NEST (Neural Simulation Tool)', Scholarpedia, 2007. pp. I-15. 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gluck, Stimulus Generalization and Representation in Adaptive Network Models of Category Learning [online], 1991 [retrieved on Aug. 24, 2013]. Retrieved from the Internet<URL:http:// www.google.coinlurl ?sa—t&rct—j&q—Giuck+ 4)/022STIMULUS+GENERALIZATION+AND+REPRESENTATIO N+1N +ADAPTIVE+NETWORK+MODELS±0F+CATEGORY+LEARN ING%22+ 1991.
Gollisch et al., 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.
Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002, pp. 1-128.
Hopfield JJ (1995) Pattern recognition computation using action potential timing for stimulus representation.Nature 376: 33-36.
Izhikevich E. M, and Hoppensteadt F.C. (2009) Polychronous Wavefront Computations. International Journal of Bifurcation and Chaos, 19:1733-1739.
Izhikevich E.M. (2004) Which Model to Use for Cortical Spiking Neurons? IEEE Transactions on Neural Networks, 15:1063-1070.
Izhikevich E.M. (2006) Polychronization: Computation With Spikes. Neural Computation, 18:245-282.
Izhikevich, E,M. (2007) Dynamical Systems in Neuroscience: The Geometry of Excitability and Bursting, The MIT Press, 2007.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Janowitz, M.K.; Van Rossum, M.C.W. Excitability changes that complement Hebbian learning. Network, Computation in Neural Systems, 2006, 17 (1), 31-41.
Karbowski et al., 'Multispikes and Synchronization in a Large Neural Network with Temporal Delays', Neural Computation 12. 1573-1606 (2000).
Khotanzad, 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf.
Knoblauch, et at Memory Capacities for Synaptic and Structural Plasticity, Neural Computation 2009, pp. 1-45.
Laurent, 'Issue 1—nnql Refactor Nucleus into its own file—Neural Network Query Language' [retrieved on Nov. 12, 2013]. Retrieved from the Internet:https://code.google.com/p/nnql/issues/detail?id= 1.
Laurent, 'The Neural Network Query Language (NNQL) Reference' [retrieved on Nov. 12, 2013]. Retrieved from the Internet: https://code.google.com/p/nnql/issues/detail?id=1.
Lazar et a]. 'Multichannel time encoding with integrate-and-fire neurons.' Neurocomputing 65 (2005): 401-407.
Lazar et al. 'A video time encoding machine', in Proceedings of the 15th IEEE International Conference on Image Processing (ICIP '08 2008, pp. 717-720.
Lazar et al. 'Consistent recovery of sensory stimuli encoded with MIMO neural circuits.' Computational intelligence and neuroscience (2010): 2.
Masquelier and Thorpe, Learning to recognize objects using waves of spikes and Spike Timing-Dependent Plasticity. Neural Networks (IJCNN), The 2010 International Joint Conference on DOI—10. 1109/1JCNN.2010.5596934 (2010) pp. 1-8.
Masquelier, Timothee, 'Relative spike time coding and STOP-based orientation selectivity in the early visual system in natural continuous and saccadic vision: a computational model.' Journal of computational neuroscience 32.3 (2012): 425-441.
Meister, M.; Berry, M.J. The neural code of the retina, Neuron, 1999, 22, 435-450.
Meister, M, Multineuronal codes in retinal signaling. Proceedings of the National Academy of sciences. 1996, 93, 609-614.
Nichols, A Reconfigurable Computing Architecture for Implementing Artificial Neural Networks on FPGA, Master's Thesis, The University of Guelph, 2003, pp. 1-235.
Oster M., Lichtsteiner P,, Delbruck T, Liu S, A Spike-Based Saccadic Recognition System, ISCAS 2007. IEEE International Symposium on Circuits and Systems, 2009, pp. 3083-3086.
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet: http://citeseerx.ist.psu.edu!viewdoc/download?doi= 0.1.1.5.4346&rep—repl&type-pdf.
Rekeczky, et al., "Cellular Multiadaptive Analogic Architecture: A Computational Framework for UAV Applications." May 2004.
Revow M., Williams C ,, and Hinton, G.E., 1996. Using Generative Models for Handwritten Digit Recognition, IEEE Trans. on Pattern Analysis and Machine Itelligence, 18, No. 6, Jun. 1996.
Sanchez, Efficient Simulation Scheme for Spiking Neural Networks. Doctoral Thesis. (Juiversita di Granada Mar. 28, 2008, pp. 1-104.
Sato et al., 'Pulse interval and width modulation for video transmission.' Cable Television, IEEE Transactions on 4 (1978): 165-173.
Schemmel, J., et al., Implementing synaptic plasticity in a VLSI spiking neural network model. In: Proceedings of the 20061nternational Joint Conference on Neural Networks (IJCNN'06), IEEE Press (2006) Jul. 16-21, 2006, pp. 1-6 [online], [retrieved on Aug. 24, 2012]. Retrieved from the Internet <URL: http://www.kip.uniheidelberg.deNeroeffentlichungen/download.cgi/4620/ps/1774.pdf.
Schnitzer, M.J.; Meister, M.; Multineuronal Firing Patterns in the Signal from Eye to Brain. Neuron, 2003, 37, 499-511.
Serrano-Gotarredona, et al, "On Real-Time: AER 2-D Convolutions Hardware for Neuromorphic Spike-based Cortical Processing", Jul. 2008.
Simulink.RTM. model [online], [Retrieved on Dec. 10, 2013] Retrieved from: http://www.mathworks.com/ products/simulink/index.html.
Sinyavskiy et al. 'Reinforcement learning of a spiking neural network in the task of control of an agent in a virtual discrete

(56) References Cited

OTHER PUBLICATIONS environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi%2F10.1371%2Fjournal,pcbi.1000879.

Thomas, S., et al, (2004), Realistic Modeling of Simple and Complex Cell Tuning in the HMAX Model, and Implications for Invariant Object Recognition in Cortex, AI Memo 2004-017 Jul. 2004.

Thorpe S.; Ultra-Rapid Scene Categorization with a Wave of Spikes. In H,H. Bulthoff et al. (eds.), Biologically Motivated Computer Vision, Lecture Notes in Computer Science, 2002, 2525, pp. 1-15, Springer-Verlag, Berlin.

Thorpe, S.J., Delorme, A. & VanRullen, R, (2001). Spike-based strategies for rapid processing. Neural Networks 14, pp. 715-725.

Thorpe, S.J., Guyonneau, R., Guilbaud, N,, Allegraud, J-M, & VanRullen, R. (2004), SpikeNet: real-time visual processing with one spike per neuron. Neurocomputing, 58-60, pp. 857-864.

Van Rullen, et al. (2003), Is perception discrete or continuous? Trends in Cognitive Sciences 7(5), pp. 207-213.

Van Rullen, R., et al (2005), Spike times make sense. Trends in Neurosciences 28(1).

Van Rullen R, Thorpe, S, Rate Coding versus temporal order coding: What the Retinal ganglion cells tell the visual cortex. Neural computation, 2001, 13, 1255-1283.

Wallis, G.; Rolls, E. T. A model of invariant object recognition in the visual system, Progress in Neurobiology. 1997, 51, 167-194.

Wang 'The time dimension for scene analysis.' Neural Networks, IEEE Transactions on 16.6 (2005): 1401-1426.

Wiskott, L.; Sejnowski, T.J. Slow feature analysis: Unsupervised learning of invariances, Neural Computation, 2002, 14, (4), 715-770.

Wysoski et al, "Fast and Adaptive Network of Spiking Neuron for Multi-view Visual Pattern Recognition", May 3, 2008, Elsevier,Neurocomputing vol. 71, pp. 2563-2575.

Zarandy et al. "Bi-i: A Standalone Ultra High Speed Cellular Vision System." In: [online]. Dated Jun. 13, 2005 (Jun. 13, 2005). Retrieved on Aug. 16, 2012 (Aug. 16, 2012). Retrieved from the Internet at http://ieeexplore.ieee.orgixplilogin.jsp?tp=tarnumber=14387388turl=http%3A%2Fieeexplore.ieee.org%2Fxpls%2Fabs_all.jsp%Farnumber%3D1438738.

Paugam-Moisy et al., "Computing with spiking neuron networks," G. Rozenberg T. Back, J. Kok (Eds.), Handbook of Natural Computing, Springer-Verlag (2010) [retrieved Dec. 30, 2013], [retrieved online from link.springer.com].

* cited by examiner

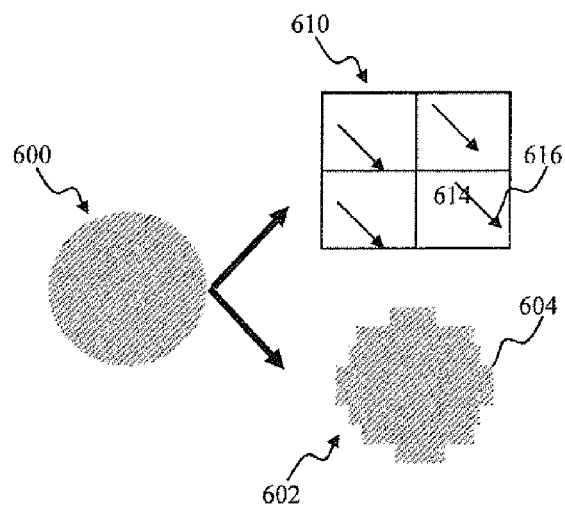
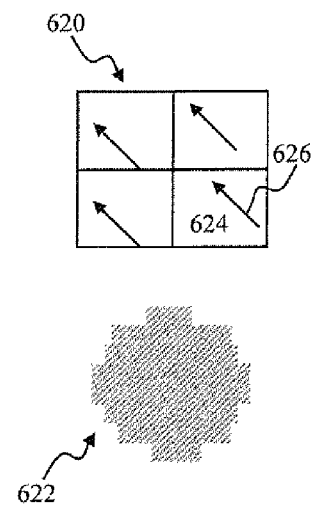
FIG. 6A           FIG. 6B
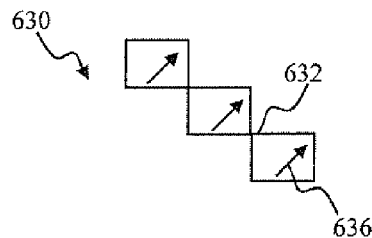
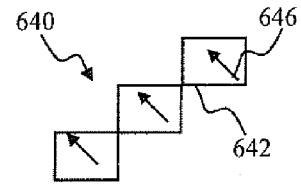
FIG. 6C

APPARATUS AND METHODS FOR REAL TIME ESTIMATION OF DIFFERENTIAL MOTION IN LIVE VIDEO

CROSS-REFERENCE AND RELATED APPLICATIONS

This application is related to co-pending and co-owned U.S. patent application Ser. No. 14/285,414entitled "APPARATUS AND METHODS FOR DISTANCE ESTIMATION USING MULTIPLE IMAGE SENSORS", filed herewith on May 22, 2014, and co-pending and co-owned U.S. patent application Ser. No. 14/285,466, entitled "APPARATUS AND METHODS FOR ROBOTIC OPERATION USING VIDEO IMAGERY", filed herewith on May 22, 2014, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates to, inter alia, computerized apparatus and methods for determining motion in video.

Description of Related Art

Object recognition in the context of computer vision relates to finding a given object in an image or a sequence of frames in a video segment. Typically, video frames may contain multiple objects moving in one or more directions on a still or moving background. Object representations, also referred to as the "view", may change from frame to frame due to a variety of object transformations, such as rotation, movement, translation, change in lighting, background, noise, appearance of other objects, partial blocking and/or unblocking of the object, and/or other object transformations. Motion estimation may generally be a very computationally expensive operation, and may be impractical in real-time for input resolutions greater than 320×240 pixels on existing lower power (e.g., mobile) computers. Robotic devices often employ video for navigation, target selection and/or obstacle avoidance. Determining the relative motion of an object from a moving robotic platform may require implementation of differential motion detection in an energy efficient manner.

SUMMARY

One aspect of the disclosure relates to a non-transitory computer-readable storage medium having instructions embodied thereon, the instructions being executable to perform a method of detecting motion in a stream of video data.

In another aspect, a method of processing raw video is disclosed. In one implementation, the processing is configured to allow for (more) efficient detection of objects present in the video, and the method includes: compressing the raw video according to a compression algorithm to produce compressed video; parsing at least a portion of the compressed video; and evaluating motion information associated with a plurality of blocks of the at least a portion of the parsed compressed video to identify a moving object therein.

In one variant, the compressing is the only processing of the raw video required for the identification of the moving object, thereby making the method substantially more efficient than prior art techniques which extensively process the war video.

In a further aspect, a video processing apparatus is disclosed. In one implementation, the apparatus includes: an input interface configured to receive a compressed video frame; a logic component adapted to determine motion information associated with a portion of the compressed frame, and evaluate the motion information for a pattern; and an output interface configured to communicate an indication based on the evaluation.

In one variant, the compressed frame is produced by a video encoder comprising a motion estimation component configured to provide the motion information; the compressed frame comprises a plurality of blocks; the motion information for a given block is determined by the video encoder based on an evaluation of the block and one other block associated with a preceding compressed frame; and the motion information for the given block comprises first and second components.

In another variant, the pattern is characterized one or more of area, shape, and velocity; and the indication is configured based on the evaluation indicating an absence of the pattern in the motion information.

In yet another variant, the compressed frame is encoded using an encoder comprising a motion estimation operation performed on individual frames of the sequence of frames; an individual block of the plurality of blocks is characterized by a block motion vector; the motion estimation operation comprises determination of a plurality of motion vectors associated with individual blocks of the plurality of blocks; and the occurrence of the feature is being determined based on an evaluation of one or more motion vector associated with individual blocks within the portion of the plurality of blocks.

In a further variant, the portion of the compressed frame comprises a representation of a person's body, the logic component is further adapted to determine motion information associated with another portion of the compressed frame conveying information amount surroundings of the person; and identification of the pattern comprises evaluation of the first motion characteristic associated with the portion and a second motion characteristic associated with the another portion.

In yet another aspect, a method of operating a video encoder apparatus is disclosed. In one implementation, the apparatus is configured to compress a raw frame of real-time video into a compressed frame, and the method includes: causing the encoder apparatus to produce the compressed frame; parsing the compressed frame, the parsing configured to provide motion information associated with the frame, the motion information comprising a plurality of components; evaluating the motion information to determine presence of an object within the raw frame; and providing an indication of the presence of the object based on the evaluation.

In one variant, the real time video is provided by a video sensor disposed on a robotic device; and the indication is configured to cause the robotic device to execute an action.

In another variant, the encoder apparatus comprises a hardware component; the real time video is provided by a video sensor disposed on a robotic device and configured to provide information related to environment of the device;

and the indication is configured to cause the robotic device to execute one of an a object approach or object avoidance action.

In a further aspect, a non-transitory computer-readable storage medium having instructions embodied thereon is disclosed. In one implementation, the instructions are executable by a processor to detect a feature in a sequence of frames of real-time video by at least: analyzing a compressed frame to determine motion information associated with individual blocks of a plurality of blocks within the compressed frame, the motion information being useful to determine occurrence of a feature within the encoded frame, the feature corresponding to a portion of the plurality of blocks; and providing an indication based on occurrence of the feature. In one variant, the compressed frame is encoded using an encoder comprising at least one motion estimation operation performed on individual frames of the sequence of frames; individual ones of the plurality of blocks are characterized by a block motion vector; the motion estimation operation comprises determination of a plurality of motion vectors associated with individual blocks of the plurality of blocks; and the occurrence of the feature is determined based on an evaluation of one or more motion vectors associated with individual blocks within the portion of the plurality of blocks.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 6A is a graphical illustration depicting an encoded object for use with the motion extraction techniques, according to one or more implementations.

FIG. 6B is a graphical illustration depicting subsequent motion of the encoded object of FIG. 6A, according to one or more implementations.

FIG. 6C is a graphical illustration depicting spatial distribution of motion extracted from encoded video, according to one or more implementations.

Figure 1:
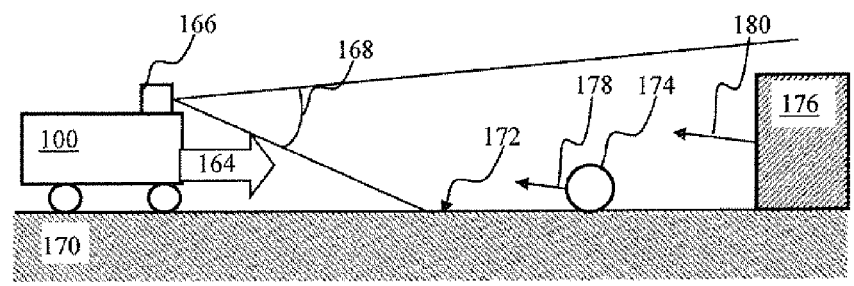
FIG. 1 is a graphical illustration depicting a robotic apparatus comprising an adaptive controller apparatus of the disclosure configured for obstacle avoidance using differential motion detection, in accordance with one or more implementations.

All Figures disclosed herein are © Copyright 2014 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#,Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides apparatus and methods for detecting motion of objects and/or features in video in real time. The video may comprise a stream of frames received from an image sensor (e.g., charge-coupled device (CCD), CMOS device, and/or an active-pixel sensor (APS), photodiode arrays, and/or other image sensors). In one or more implementations, the input may comprise a pixel stream downloaded from a file. An example of such a file may include a stream of two-dimensional matrices of red green blue (RGB) values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) are equally applicable to and useful with the various aspects of the present disclosure. Furthermore, data frames corresponding to other (non-visual) signal modalities such as sonograms, IR, radar or tomography images may be equally compatible with the processing methodology of the disclosure, or yet other configurations.

As used herein the term feature may refer to a representation of an edge, determined by change in color, luminance, brightness, transparency, texture, curvature and/or other characteristic. The object features may comprise, inter alia, individual edges, intersections of edges (such as corners), orifices, curves, cavities, and/or other physical dimensions. Those of ordinary skill in the related arts will readily appreciate that physical features are useful to characterize e.g., solid objects and environments, however the techniques described herein are equally applicable to liquids, fluids, viscous substances, vapors, gasses, etc. Moreover, within the context of object recognition, object edges more broadly encompass the characteristic extrusions, intrusions, continuous, and/or discontinuous topological elements of the surface, quasi-surface (such as with gasses), and/or boundaries of the object. Those of ordinary skill will readily appreciate that practical limitations of sensors and computational power may render perfect representation of the object infeasible, thereby requiring approximations in object modeling. Common object approximations include wireframe modeling, topological relief, or any other mathematical representation of one or more edges, surfaces, and/or vertices of the physical object.

FIG. 1 depicts a mobile robotic apparatus that may be configured with a motion detection apparatus in accordance with one or more implementations illustrated in FIGS. 2-5, described infra. The robotic apparatus 160 may comprise a camera 166. The camera 166 may be characterized by a field of view 168 (e.g., an extent of the observable world that may be captured by the camera lens at a given moment). The camera 166 may provide information associated with objects within the field-of-view 168. In some implementations, the camera 166 may provide frames of pixels of luminance and/or color, refreshed at 25 Hz frame rate. However, it will be appreciated that, in some implementations, other frame rates may be used (whether constant or variable).

As shown within FIG. 1, one or more objects (e.g., a floor 170, a stationary object 176, a moving object (e.g., ball 174), and/or other objects) may be present within the camera's field of view. The motion of the objects may result in a displacement of pixels representing the objects within successive frames, such as described in co-owned U.S. patent application Ser. No. 13/689,717 filed on Nov. 29, 2012 and entitled "APPARATUS AND METHODS FOR OBJECT DETECTION VIA OPTICAL FLOW CANCELLATION", incorporated herein by reference in its entirety.

When the robotic apparatus 160 is in motion, such as shown by arrow 164 in FIG. 1, the relative motion of the objects within the camera's 166 field of view 168 (e.g., denoted by arrows 172, 178, 180 in FIG. 1) may comprise the self-motion component (i.e., the motion of the robotic apparatus 160) and the object's own motion component. By way of a non-limiting example, motion of objects in FIG. 1 may comprise apparent motion 180 of the stationary background 176 and the boundary (e.g., the component 172 associated with the floor boundary); (ii) component 178 associated with the moving ball 174 that comprises a superposition of the ball displacement and motion of the camera; and/or other components. Determination of the ball 174 motion may be particularly challenging when the camera 160 is in motion (e.g., during panning) and/or when the field of view is changing (e.g., when zooming in/out).

Figure 2:
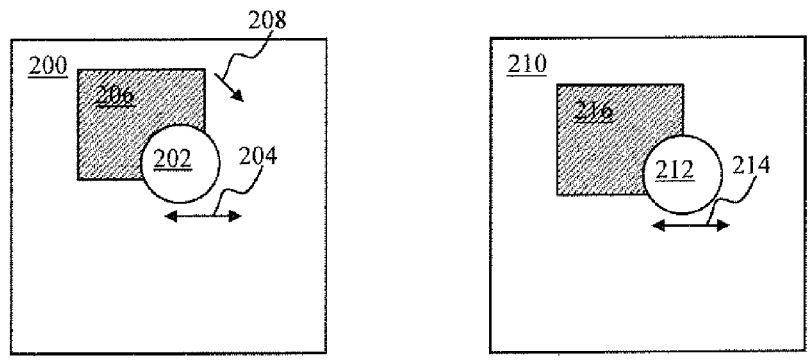
FIG. 2 is a graphical illustration depicting input frames comprising a plurality of moving objects for use with motion extraction techniques, according to one or more implementations.

FIG. 2 depicts two exemplary frames (e.g., provided by the camera 166 in FIG. 1) comprising multiple moving objects useful with motion estimation methodology described herein. As shown, the frames 200, 210 comprise an object 206, 216 that may move in a given direction (e.g., 208). The frames 200, 210 also include an object (e.g., ball) 202, 212 that may move back and forth in a direction indicated by arrow 204, 214. In some implementations of target approach by a robotic device, the controller of the robotic vehicle 100 is instructed to follow the target. Frames 200, 210 may represent the frames of video data as collected by the robot's camera, and which shows the position of objects at two time instances. Due to the presence of multiple independent motions, the detection of the object 202, 212 may be not straightforward. For example, portions of the frames 200, 210 are characterized by differential motion.

In some implementations of object detection in the presence of differential motion, background (and/or self-motion) may be determined using a statistical analysis of motion distribution within a given encoded frame. Various statistical parameters (e.g., median, mean plus/minus N standard deviations, etc.) may be determined, in order to determine the prevailing (dominant) motion vector for the frame. The prevailing motion may be removed (e.g., via a vector subtraction) from the frame motion distribution in order to determine residual motion. The residual motion may be analyzed (e.g., using a threshold technique) in order to detect one or more features that may be moving differently from the prevailing motion.

In one or more implementations of object detection in the presence of differential motion, prevailing motion may be determined using a clustering technique. The motion field within the frame may be partitioned into a plurality of clusters based on an analysis of motion distribution. The largest area cluster is associated with the prevailing (dominant) motion; the largest area cluster may be removed (masked off) from the frame to obtain the residual motion distribution. The residual motion may be analyzed in order to determine the presence of one or more features based on the remaining clusters of motion.

Those of ordinary skill in the related arts will readily appreciate that the aforementioned implementations of object detection in the presence of differential motion are purely illustrative. The foregoing techniques may be combined, substituted, or augmented with other techniques (e.g., predictive determination, probabilistic determination, out-of-band determination, etc.) with equivalent success, given the contents of the present disclosure.

Figure 3:
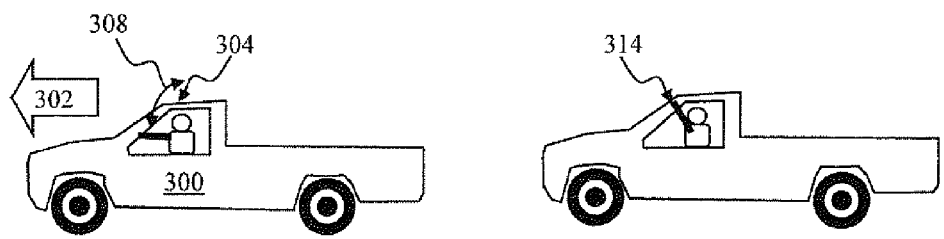
FIG. 3 is a graphical illustration depicting a moving person in a moving vehicle, according to one or more implementations.

FIG. 3 illustrates one exemplary task characterized by differential motion. A robotic apparatus may be configured to detect one or more gestures by a person disposed in a moving vehicle. The vehicle 300 may move in a direction 302. A driver of the vehicle may move a hand and/or an arm in a direction indicated by arrow 308. A first arm position 304 may indicate one context configuration (e.g., start/proceed); while a second arm position 314 may indicate another context configuration (e.g., stop/pause).

Figure 4:
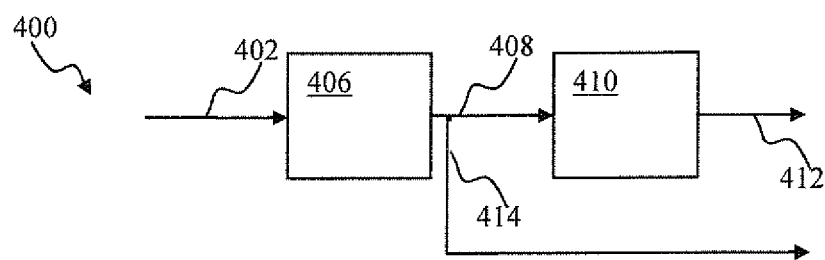
FIG. 4 is a functional block diagram depicting a motion extraction apparatus, according to one or more implementations.

FIG. 4 depicts a motion extraction apparatus, according to one or more implementations. The apparatus 400 may comprise an encoder component 406 configured to encode input video stream 402. The input 402 may comprise one or more frames received from an image sensor (e.g., charge-coupled device (CCD), CMOS device, and/or an active-pixel sensor (APS), photodiode arrays, and/or other image sensors). In one or more implementations, the input may comprise a pixel stream downloaded from a file. An example of such a file may include a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) are equally applicable to and useful with the various aspects of the present disclosure. Furthermore, data frames corresponding to other (non-visual) signal modalities such as sonograms, IR, radar or tomography images are equally compatible with the processing methodology of the disclosure, or yet other configurations.

The component 406 may comprise a specialized video encoder configured to implement video encoding comprising a motion estimation operation. In one or more implementations, the component 406 may comprise a dedicated integrated circuit (IC) disposed on a single or multiple die), a component of a processing system (e.g., video encoder block of a Snapdragon® system on a chip), an ASIC, an FPGA with a video encoder intellectual property (IP) core, an OEM printed circuit board, and/or other. Video encoding effectuated by the component 406 may comprise any applicable standard comprising motion estimation between a current frame and a preceding frame. Some encoding implementations may comprise H.264/MPEG-4 advanced video coding described, e.g., a MPEG-4 standard described in e.g., *ISO/IEC 14496-10, 2009—MPEG-4 Part 10, Advanced Video Coding,* a H.263 standard described in, e.g., *ITU-T H.263 TELECOMMUNICATION STANDARDIZATION SECTOR OF ITU (01/2005) SERIES H: AUDIOVISUAL AND MULTIMEDIA SYSTEMS Infrastructure of audiovisual services—Coding of moving video, Video coding for low bit rate communication;* a H.262/MPEG-2 standard, described in e.g., *ISO/IEC 13818-2 2013-10-01 Information technology—Generic coding of moving pictures and asso-*

*ciated audio information—Part 2: Video,* a H.265 standard described in, e.g., *ITU-T H.263 TELECOMMUNICATION STANDARDIZATION SECTOR OF ITU* (04/2013), *SERIES H: AUDIOVISUAL AND MULTIMEDIA SYSTEMS Infrastructure of audiovisual services—Coding of moving video, High efficiency video coding;* each of the foregoing being incorporated herein by reference in its entirety. See also Exhibit I hereto, which contains exemplary computer code useful for processing image data consistent with, e.g., the ISO/IEC 1196-10 and H.265 Standards referenced above.

The component 406 may provide encoded video output 408. The output 408 may be characterized by a lower data rate (e.g., as represented by fewer bits per frame) as compared to the input video signal 402. The output 408 may comprise compressed pixel luminance and/or chromaticity data. The output 408 may also comprise motion information, e.g., as illustrated in FIG. 6A which depicts an output of a video encoder useful with the motion extraction methodology. In one or more implementations, the output illustrated in FIG. 6A may correspond to the representation of an object, e.g., a moving ball represented by a hashed circle 600 in FIG. 6A in input 402 of FIG. 4. The encoded output 408 may comprise a luminance component (also referred to as luma) depicted by area 602 in FIG. 6A. The encoded luminance may be comprised of a plurality of macroblocks 604. The size and number of the macroblocks may be configured in accordance with the requirements or specifications of an application (e.g., encoding standard, video frame size, resolution, quality, refresh rate, bit depth, channel (e.g., luma, chroma), etc.); for example, sample macroblocks may be 16×16 for the luma channel and 8×8 for the chroma channel for H.264 encoder.

The encoded output 408 (that also may be referred to as the compressed video) may comprise motion information, denoted by area 610 in FIG. 6A. Motion information may comprise one or more vectors (e.g., 616) associated with one or more macroblocks (e.g., 614).

Compressed video 408 in FIG. 4 may be provided to a processing component 410. The component 410 may be configured to parse the compressed video stream 408 in order to extract or obtain motion information (e.g., map of vectors 616 in FIG. 6A). By way of an illustration, the motion information may comprise a macroblock location L (e.g., index), x-component, and y-component of motion of pixels associated with the macroblock location L. The extracted motion information 412 may be provided to another component (not shown). Various uses of the motion information may be contemplated such as, for example, object detection, gesture detection, motion detection, apparent/actual velocity estimation, apparent/actual speed estimation, motion prediction, orientation detection (e.g., inversion, etc.), etc. In some implementations, the compressed video may also be provided via a pathway 414 to another target destination (e.g., general purpose processor for streaming to a display and/or other components).

Figure 5:
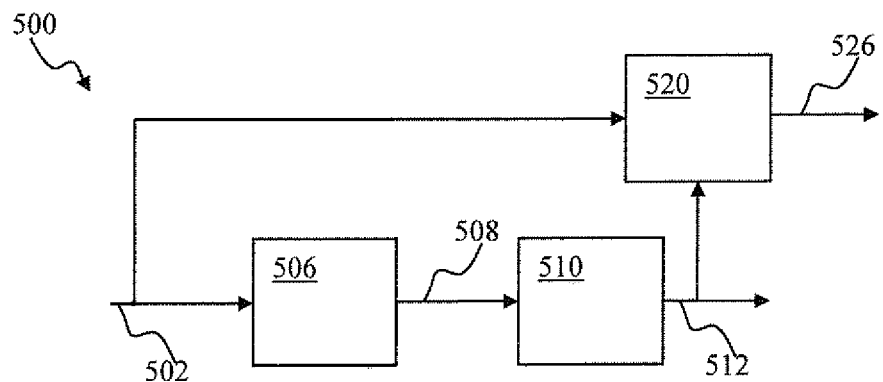
FIG. 5 is a functional block diagram depicting a video processing system, comprising a differential motion extraction apparatus, according to one or more implementations.

FIG. 5 depicts a video processing system, comprising a differential motion extraction apparatus, according to one or more implementations. The system 500 of FIG. 5 may be configured to receive sensory input 502. In some implementations, the input 502 may comprise the input 402 described above with respect to FIG. 4. The input 502 may be encoded by a video encoder component 506. In one or more implementations, the component 506 may comprise the component 406 described above with respect to FIG. 4. The component 506 may be configured to encode the input 502 using one or more encoding formats (e.g., H.264). The encoded signal 508 may be provided to component 510. In some implementations, the component 510 may be configured to parse the encoded signal 508 to extract motion information 512. Parsing the video stream data may comprise reading individual data package from the encoded video stream and determining as to whether it corresponds to a P-frame (motion frame), composed of encoded macroblocks. Individual macroblock is composed of a x and y motion component. As part of the parsing process these motion components may be extracted per macroblock and represented at their corresponding spatial position within the image. The extracted motion information may be used in controlling a robotic device. As used herein, the term "parse" and "parsing" are used to refer to analysis of a string of characters according to one or more rules (e.g., conventions, grammars, etc.). For instance, in one exemplary embodiment, the motion information is provided within a data structure comprising one or more vectors comprising a change in displacement (i.e., speed), and a direction of change (i.e., direction). Other forms of motion information may include e.g., displacement, speed, velocity, acceleration, and/or estimates thereof. Common examples of data structures include e.g., strings, arrays, multi-dimensional arrays, lists, hash tables, etc.

The extracted motion information (e.g., 412, 512 in FIGS. 4-5, respectively) may comprise horizontal and/or vertical displacement (e.g., the motion vector components (dx, dy)) of a pixel group (e.g., a macroblock) between the current frame and a preceding frame. In some implementations of video encoding useful with a pipeline-based multimedia framework (e.g., GStreamer framework, http://gstreamer-.freedesktop.org/, incorporated herein by reference in its entirety), the parsed motion information may be represented by re-purposing existing channels e.g., YUV color channels. In one such implementation, the (U, V) channels may be reused to represent the (dx, dy) displacement and the Y channel may be reused to representing additional information (e.g., an indication as to whether the current frame is the keyframe (containing the starting and ending points), macroblock size (e.g., 16×16, 8×8 and/or other size), and/or other information). Using the foregoing model to represent motion information may advantageously reduce computational load on, e.g., a neural network component 520, and enable access to motion information without necessitating further decoding/encoding operations in order to extract the motion vector components.

The input 502 may be processed by a processing component 520. The neural network component 520 may comprise an artificial neuron network (ANN) comprising a plurality of nodes. Individual nodes of the neural network component 520 may comprise neuron units characterized by a receptive field, e.g., a region of space in which a presence of a stimulus may affect response of the neuron. In some implementations, the units may comprise spiking neurons and the ANN may comprise a spiking neuron network, (SNN). Various implementations of SNN may be utilized with the disclosure, such as, for example, those described in co-owned, and/or co-pending U.S. patent application Ser. Nos. 13/774,934, entitled "APPARATUS AND METHODS FOR RATE-MODULATED PLASTICITY IN A SPIKING NEURON NETWORK" filed Feb. 22, 2013, 13/763,005, entitled "SPIKING NETWORK APPARATUS AND METHOD WITH BIMODAL SPIKE-TIMING DEPENDENT PLASTICITY" filed Feb. 8, 2013, 13/152,105, filed Jun. 2, 2011 and entitled "APPARATUS AND METHODS FOR TEMPORALLY PROXIMATE OBJECT RECOGNITION", 13/487,533, filed Jun. 4, 2012 and entitled "SYSTEMS AND APPARATUS FOR IMPLEMENTING TASK- SPECIFIC LEARNING USING SPIKING NEURONS", 14/020,376, filed Sep. 6, 2013 and entitled "APPARATUS AND METHODS FOR EVENT-BASED PLASTICITY IN SPIKING NEURON NETWORKS", 13/548,071, filed Jul. 12, 2012 and entitled "SPIKING NEURON NETWORK SENSORY PROCESSING APPARATUS AND METHODS", 13/152,119, filed Jun. 2, 2011, entitled "SENSORY INPUT PROCESSING APPARATUS AND METHODS", 13/540,429, filed Jul. 2, 2012 and entitled "SENSORY PROCESSING APPARATUS AND METHODS", 13/623,820, filed Sep. 20, 2012 and entitled "APPARATUS AND METHODS FOR ENCODING OF SENSORY DATA USING ARTIFICIAL SPIKING NEURONS", 13/623,838, filed Sep. 20, 2012 and entitled "SPIKING NEURON NETWORK APPARATUS AND METHODS FOR ENCODING OF SENSORY DATA", 12/869,573, filed Aug. 26, 2010 and entitled "SYSTEMS AND METHODS FOR INVARIANT PULSE LATENCY CODING", 12/869,583 , filed Aug. 26, 2010, entitled "INVARIANT PULSE LATENCY CODING SYSTEMS AND METHODS", 13/117,048, filed May 26, 2011 and entitled "APPARATUS AND METHODS FOR POLYCHRONOUS ENCODING AND MULTIPLEXING IN NEURONAL PROSTHETIC DEVICES", 13/152,084, filed Jun. 2, 2011, entitled "APPARATUS AND METHODS FOR PULSE-CODE INVARIANT OBJECT RECOGNITION", 13/239,255filed Sep. 21, 2011, entitled "APPARATUS AND METHODS FOR SYNAPTIC UPDATE IN A PULSE-CODED NETWORK", 13/487,576entitled "DYNAMICALLY RECONFIGURABLE STOCHASTIC LEARNING APPARATUS AND METHODS", filed Jun. 4, 2012, and U.S. patent No. 8,315,305, entitled "SYSTEMS AND METHODS FOR INVARIANT PULSE LATENCY CODING" issued Nov. 20, 2012, each of the foregoing being incorporated herein by reference in its entirety.

Receptive fields of the network 520 units may be configured to span several pixels with the input 502 frames so as to effectuate sparse transformation of the input 502. Various applicable methodologies may be utilized in order to effectuate the sparse transformation, including, for example, those described in co-owned U.S. patent application Ser. No. 13/540,429, entitled "SENSORY PROCESSING APPARATUS AND METHODS", filed Jul. 2, 2012, and 13/623,820, entitled "APPARATUS AND METHODS FOR ENCODING OF SENSORY DATA USING ARTIFICIAL SPIKING NEURONS", filed on Sep. 20, 2012, each of the foregoing being incorporated herein by reference in its entirety. In some implementations, the encoding may comprise a sparse transformation, described in, e.g., U.S. patent application Ser. No. 14/191,383, entitled "APPARATUS AND METHODS FOR TEMPORAL PROXIMITY DETECTION", filed on Feb. 26, 2014, the foregoing being incorporated herein by reference in its entirety.

The output 512 of the parsing component 510 may be provided to the processing component 520. In some implementations, the neural network component 520 may use the motion information 512 in order to determine characteristics (e.g., location, dimension, shape, and/or other) of one or more objects in sensory input 502. In one or more implementations, the neural network component 520 may comprise an adaptive predictor component configured to determine a control output 526 for a robotic device (e.g., the vehicle 100 in FIG. 1) based on the input 512 and/or inputs 502, 512. In some implementations of autonomous vehicle navigation, the input(s) 512 and/or 502 may be used by the component 520 in order to predict (or generate) a control signal configured to cause the vehicle 100 in FIG. 1 to execute an obstacle avoidance action (e.g., a turn, a reverse, or other evasive maneuver). Various implementations of predictors may be employed with the motion detection approach described herein, including, e.g., co-owned U.S. patent application Ser. No. 13/842,530, entitled "ADAPTIVE PREDICTOR APPARATUS AND METHODS", filed on Mar. 15, 2013, the foregoing being incorporated herein by reference in its entirety.

FIG. 6B depicts the subsequent motion vectors (of the object of FIG. 6A), which were obtained from encoded video, according to one or more implementations. Hashed area 622 in FIG. 6B may represent the luminance component of an image of a ball (e.g., 600 in FIG. 6A). The encoded output of FIG. 6A may comprise motion information, denoted by the area 620. Motion information may comprise one or more vectors (e.g., 626) associated with one or more corresponding macroblocks (e.g., 624). Encoded representations of FIGS. 6A-6B may be used to determine temporal distribution of motion associated with the ball 600. The motion pattern of alternating opposing motion vectors 616, 626 may be employed to communicate an action indication to a robotic device (e.g., a gestured command). For instance, in some use scenarios, a user may shake an object from left to right in front of a camera of an autonomous vehicle in order to indicate that the target (and/or object) should be followed.

FIG. 6C illustrates a spatial distribution of motion extracted from encoded video, according to one or more implementations. The representation shown in FIG. 6C may comprise portion 630 comprising a first plurality of macroblocks 632 characterized by first motion direction 636. The representation shown in FIG. 6C may comprise portion 640 comprising a second plurality of macroblocks 642 characterized by second motion direction 646. The spatial motion map illustrated in FIG. 6C may be employed to communicate an action indication (e.g., a gestured command) to a robotic device. For example, a user can wave their arms (in a crisscross manner) in order to indicate a stop and/or other command.

In some implementations (not shown) motion information for a given frame may be characterized by a plurality of different motion vectors due to, e.g., motion of different objects, camera pan/zoom operation, and/or video acquisition from a moving platform. By way of an illustration of operation of the robotic vehicle 100 of FIG. 1, a video signal obtained by the camera 166 may comprise a representation of human making gestures superimposed on a moving background.

Detection of one motion associated with the gestures on a background motion may be referred to as differential motion detection. In some implementations, the background may be characterized by spatially coherent (uniform) motion which indicates a "panning" movement. In other implementations, the background may be characterized by movement radiating out (zooming in), or radiating in (zooming out). Those of ordinary skill in the related arts will readily appreciate that combinations of panning movement and zoom movement will result in other recognizable characteristic distortion effects.

Once the background motion for a given frame has been estimated and removed. The resultant motion field may be analyzed in order to determine the relative motion of other objects, e.g., hand gesture(s) and/or objects. In one or more implementations, a sequence of frames may be characterized by the background motion that is temporally coherent over timescale associated with the frame sequence. Background motion for the sequence of frames may be estimated and removed from individual frames within the sequence. The resultant motion field may be analyzed in order to determine, e.g., hand gesture(s) and/or objects.

Figure 7:
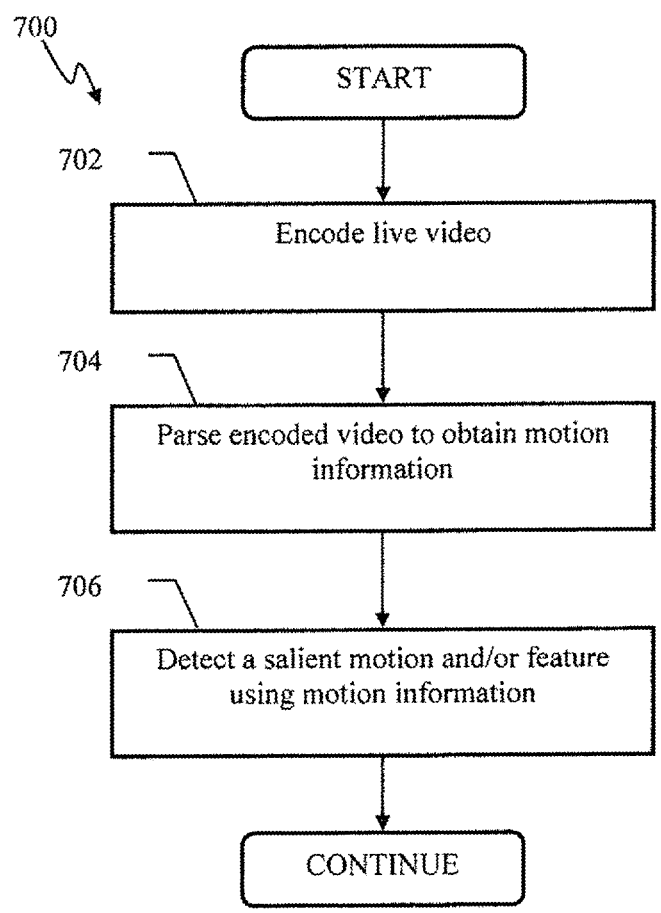
FIG. 7 is a logical flow diagram illustrating a method of determining a salient feature using encoded video motion information, in accordance with one or more implementations.
Figure 8:
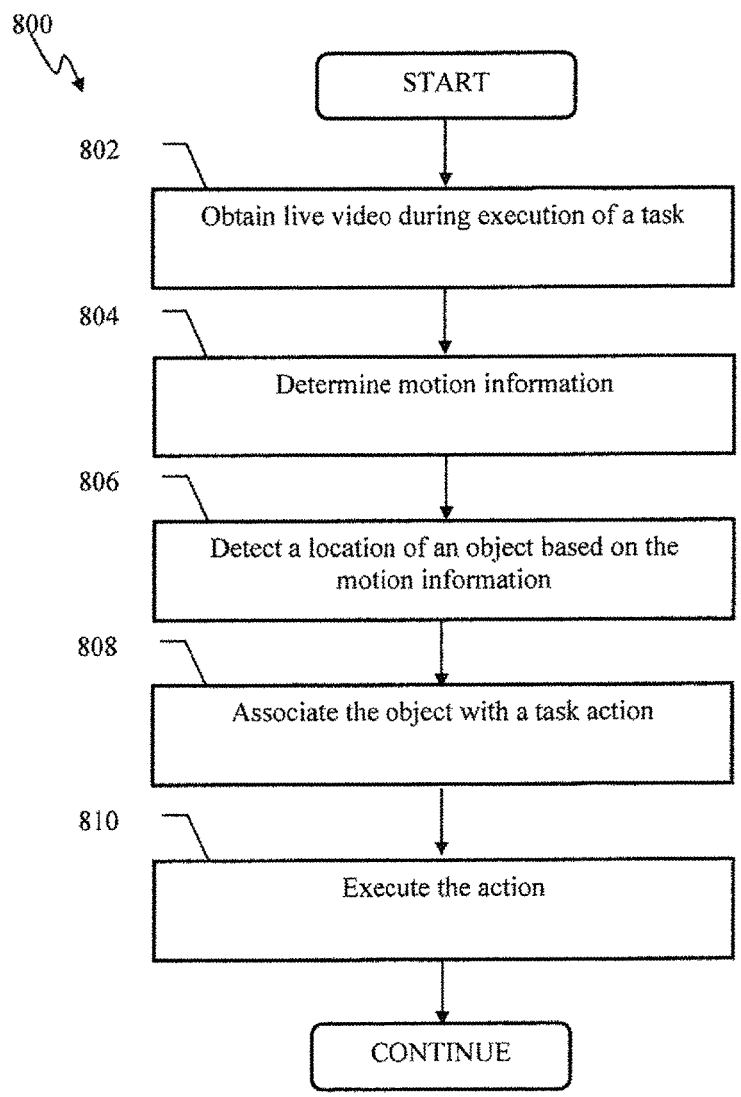
FIG. 8 is a logical flow diagram illustrating a method of data processing useful for determining features, in accordance with one or more implementations.
Figure 9:
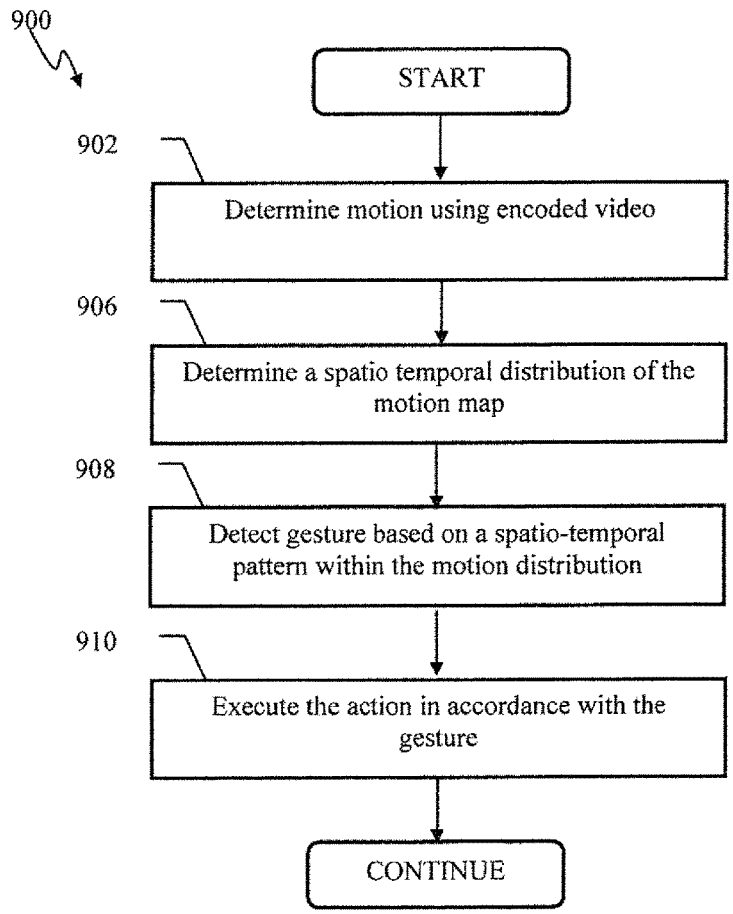
FIG. 9 is a logical flow diagram illustrating a method of executing an action configured based on a gesture detected using motion information, in accordance with one or more implementations.

FIGS. 7-9 illustrate methods 700, 800, 900 of determining and using motion information from encoded video. The operations of methods 700, 800, 900 presented below are intended to be illustrative. In some implementations, method 700, 800, 900 may be accomplished with one or more additional operations not described, and/or without one or more of the operations discussed. Additionally, the order in which the operations of method 700, 800, 900 are illustrated in FIGS. 7-9 and described below is not intended to be limiting.

In some implementations, methods 700, 800, 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 800, 900 in response to instructions stored electronically on an electronic storage medium. The one or more processing devices may include one or more devices configured through hardware, firmware, and/or software to be specifically designed for execution of one or more of the operations of methods 700, 800.

FIG. 7 illustrates a method 700 of determining a salient feature using encoded video motion information, in accordance with one or more implementations.

Operations of method 700 may be applied to processing of sensory data (e.g., audio, video, RADAR imagery, SONAR imagery, etc.), observation data, motor command activity in a robotic system, and/or other systems or data.

At operation 702 of method 700, one or more a consecutive input video frames may be encoded. In one or more implementations, the frames may be provided by an image sensor (e.g., CCD, CMOS device, and/or APS, photodiode arrays, and/or other image sensors). In some implementations, the input may comprise a pixel stream downloaded from a file, such as a stream of two-dimensional matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance YUV, YCbCr, CMYK, grayscale, and/other image representations) may be applicable to and useful with the various implementations. Data frames corresponding to other (non-visual) signal modalities such as sonograms, IR, radar or tomography images may be compatible with the processing methodology of the disclosure, and/or other configurations. The frames may form real-time (live) video. In one or more implementations, the encoding may comprise operations performed in accordance with any applicable encoding standard that supports motion estimation between successive frames (e.g., H.263, H.264, and/or other).

At operation 704 of method 700, the encoded video stream is parsed to obtain motion information. In some implementations, the motion information may comprise a plurality of motion vectors and their locations as associated with one or more macroblocks within the encoded frame (e.g., the vector 616 of macroblock 614 in FIG. 6A).

In some embodiments, the frame comprises one or more of: control information, data, delimiters, metadata, etc. Examples of control information include for example: scrambler reset, frame reset, blanking start/end, frame start/end, etc. Examples of data include without limitation: audio/visual data, motion vectors, etc. Common examples of delimiters include without limitation: headers, preambles, midambles, post-ambles, cyclic prefixes/postfixes, synchronization bits, flag bits, etc. Common examples of metadata include without limitation: error correction information, cyclic redundancy check (CRC) information, etc.

In one embodiment, the frame is parsed into its constituent components. Error correction is performed if available. Thereafter, the motion information is identified and extracted. In other embodiments, only the information of interest (the motion information) is identified and parsed out of the frame. Still other embodiments may provide flag bits (or other indicia) which indicate the presence of motion information within the frame; motion information is extracted when present.

At operation 706 of method 700, a salient motion and/or feature may be determined based at least in part on the motion information. In one or more implementations, the motion and/or feature determination may be based on analysis of a map of the spatial distribution of motion within a given frame (e.g., the motion map comprising the area 630, 640 in FIG. 6C). In one or more implementations, the feature determination may be configured based on analysis of the spatial motion map's temporal characteristics (e.g., distribution of motion and/or features within a frame, persistence of motion and/or features at a given location over multiple frames, difference of motion and/or features at a given location between two or more frames, and/or other inter-frame/intra-frame analysis techniques).

In some embodiments, the salient motion and/or feature may be based on the rate of motion or change in feature. For example, certain sudden changes in the motion or feature may indicate urgency or importance (i.e., a user frantically waving arms to indicate an immediate stop). In other embodiments, the salient motion and/or feature may be based on the type of motion; for example, a user moving a right hand may be interpreted with a different priority than the user left hand (or vice-versa). In still other embodiments, the salient motion and/or feature may be determined within the relative frame. For example, a robotic vehicle may be configured to follow a target by keeping a target within the relative center of its visual field (i.e., as the target moves, the robotic vehicle must follow the target's movements).

FIG. 8 illustrates a method 800 of data processing useful for determining features, in accordance with one or more implementations.

At operation 802 of the method 800, live video may be obtained during execution of a task. In some implementations of robotic vehicle navigation, the video may be obtained from a video camera disposed on the vehicle. The video stream may be encoded using any applicable standard comprising motion estimation operation (e.g., H.263, H.264, and/or other video standard).

At operation 804 of the method 800, the motion information may be determined from the encoded video stream. In some implementations, the encoded video stream may be parsed in order to obtain motion information. In some implementations, the motion information may comprise a plurality of motion vectors and corresponding locations (coordinates) as associated with one or more macroblocks within the encoded frame (e.g., the vector 616 of macroblock 614 in FIG. 6A). In some embodiments, the motion information is extracted from a frame of video data. In one such embodiment, the frame is parsed based on one or more of: control information, data, delimiters, metadata, and/or other parameters.

At operation 806 of the method 800, a location of an object within the video frame may be determined using motion information obtained at operation 804. In one or more implementations, the location determination may be based on temporal and/or spatial persistence (coherence) of motion over a given area and/or over several frames. By way of an illustration, a plurality of macroblocks characterized by motion vectors within a given margin from one another (e.g., 5-20% in one implementation) in a given frame may indicate a moving object. As previously noted, the object detection may require that ancillary differential motion detection is performed and that unwanted motion is removed (e.g., due to panning, zooming, movement, and/or other motion).

At operation 808 of the method 800, the motion of the object associated with the location determined at operation 806 may be associated with a corresponding task action. Based on the action determination, a control signal may be provided. In some implementations, the control signal provision may be configured based on operation of an adaptive predictor, e.g., such as described in co-owned, co-pending U.S. patent application Ser. No. 13/842,530, entitled "ADAPTIVE PREDICTOR APPARATUS AND METHODS", filed on Mar. 15, 2013, incorporated supra.

At operation 810 of the method 800, the corresponding task action may be executed. By way of an illustration, the object may comprise a ball 174 in FIG. 1, the motion information may indicate the ball moving to the left of the vehicle, and the task may comprise target pursuit, which results in a corresponding left turn by the vehicle.

FIG. 9 is a logical flow diagram illustrating a method 900 of executing an action configured based on a gesture detected using motion information, in accordance with one or more implementations.

At operation 902 of the method 900, one or more motion information may be determined using one or more encoded video frames. In some implementations, the motion information may comprise motion vectors due to gestures of a human (e.g., vectors 636, 646 in FIG. 6B).

At operation 904 of the method 900, a spatio-temporal distribution of the motion information may be determined. In some implementations of spatial motion distribution, the motion map may comprise more areas of macroblocks (e.g., the area 610 in FIG. 6A and/or 640 in FIG. 6B) characterized by similar motion vector components. (e.g., components of vector 646 in FIG. 6B). In some implementations, temporal motion distribution may be determined by analyzing motion associated with a portion of the frame (e.g., the area 640 in FIG. 6B) over a plurality of consecutive frames.

In determining the spatio-temporal distribution of motion information, the distribution of motion and/or features within a frame, persistence of motion and/or features at a given location over multiple frames, and difference of motion and/or features at a given location between two or more frames, etc. may be considered. More directly, the determination of spatio-temporal distribution of motion information comprises determining the characteristic changes in motion, as a function of location and time within a frame of video data. Spatio-temporal motion information may be useful for identifying the presence of e.g., gestures such as a user's motion of arms in a crisscross manner.

At operation 906 of the method 900, a gesture may be identified from the spatio-temporal pattern within the motion distribution. By way of an illustration, a pattern of alternating motion vectors of a rectangular area within the frame may correspond to a crisscross motion of arms by the user indicating an alert (e.g., a stop) command to the robotic device. Detecting hand waiving of the user, may cause the robot to orient (body and/or camera) towards the user. Other hand, arm, leg and/or body movement by the user may cause the robot to perform various behaviors such as turn around, approach, orient, vocalize, start moving, stop moving and other actions. In some implementations, the motion information for a given frame may be characterized by a plurality of different motion vectors due to, e.g., motion of different objects, camera pan/zoom operation, and/or video acquisition from a moving platform. By way of an illustration, within the context of the robotic vehicle 100 of FIG. 1, a video signal obtained by the camera 166 may comprise a representation of human making gestures superimposed on a moving background (e.g., other moving cars), in conjunction with the robotic vehicle's own motion.

In one embodiment, the identified gesture is associated with a number of instructions, tasks, actions, etc. In some cases, the association between gestures and instructions, tasks, actions, etc. is learned or programmed during one or more training sessions. In other cases, the associations are based on pre-programmed capabilities. Still other implementations may allow a user to upload a pre-programmed model e.g., procured from another user, previously programmed, purchased from an online database, etc.

At operation 908 of the method 900, an action may be executed in accordance with the gesture determined at operation 906. For example, upon detecting the crisscross arm motion the robotic device may stop trajectory navigation.

The motion-based gesture detection methodology described herein may be employed for operation of a robotic appliance and/or remotely operated device. In some implementations, gesture detection may be effectuated by a spoofing controller, e.g., such as described in co-owned, U.S. patent application Ser. No. 14/244,892, entitled "SPOOFING REMOTE CONTROL APPARATUS AND METHODS", filed on Apr. 3, 2014, incorporated herein by reference in its entirety. The spoofing controller may be trained to develop associations between the detected gestures and one or more remote control commands (by e.g., an IR remote operating a home appliance (TV)). The developed associations may enable the spoofing controller to operate the TV in accordance with gestured of a user in lieu of the remote controller commands.

A commercially available off-the shelf hardware video encoder (e.g., 406 in FIG. 4) may be used to provide a compressed video stream. Typically, hardware encoders may be utilized in order to reduce video data rate in order to reduce storage, and/or bandwidth load associated with manipulation of video information. Motion extraction methodology described herein may advantageously enable determination of motion information by an application device using available compressed video albeit that is used for other purposes (e.g., reduction in storage and/or bandwidth). Use of available compressed video, comprising motion estimation data (e.g., MPEG-4) may substantially reduce computational load associated with motion determination, compared to existing techniques such as optical flow, graphical processing, motion interpolation/extrapolation, block matching, phase correlations and/or other motion estimation techniques.

Various aspects of the disclosure may advantageously be applied to design and operation of apparatus configured to process sensory data. Implementations of the principles of the disclosure may be applicable to detecting objects by a wide variety of stationary and portable video devices, such as, for example, smart phones, portable communication devices, notebook, netbook and tablet computers, surveillance camera systems, and practically any other computerized device configured to process vision data. The motion information may be used as a proxy for optic flow (estimated motion (dx, dy) on a grid across the frame of the video). Those of ordinary skill in the related arts will appreciate that the reuse of available hardware encoders to obtain motion data may reduce energy use by portable devices, enable motion detection on higher resolution video (e.g., resolutions greater than 320×240), and improve motion detection resolution in order to, e.g., detect gestures as compared to optic flow detection techniques.

An autonomous robotic device comprising a hardware video encoder may be capable to perform motion estimation for obstacle avoidance, tracking moving objects, stabilization, enabling a platform and/or a robot to learn its own self motion. In some, embodiments the motion detection methodology described herein may be employed for detecting salient objects in video input. The saliency of an item (such as an object, a person, a pixel, and/or other object) may be described by a characteristic by which the item may stand out relative to its neighbors. For example, an exemplary vehicle may comprise a vehicle that may be moving differently (e.g., going slower/faster than the rest of the traffic, weaving from lane to lane) compared to the rest of the traffic. A salient object for target approach may comprise a stationary and/or moving ball on a moving background due to the vehicle's own motion.

Implementations of the principles of the disclosure may be further applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking).

A video processing system of the disclosure may be implemented in a variety of ways such as, for example, a software library, an IP core configured for implementation in a programmable logic device(e.g., FPGA), an ASIC, a remote server, comprising a computer readable apparatus storing computer executable instructions configured to perform feature detection. Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

EXHIBIT I - EXEMPLARY COMPUTER CODE
© Copyright 2014 Brain Corporation. All rights reserved

```
void ff_h263_update_motion_val(MpegEncContext * s){
    const int mb_xy = s->mb_y * s->mb_stride + s->mb_x;
        //FIXME a lot of that is only needed for !low_delay
    const int wrap = s->b8_stride;
    const int xy = s->block_index[0];
    int motion_x=0, motion_y=0;
    const int block_size= 8>>s->avctx->lowres;
    s->current_picture.mbskip_table[mb_xy]= s->mb_skipped;
    if(s->mv_type != MV_TYPE_8x8){
        if (s->mb_intra) {
            motion_x = 0;
            motion_y = 0;
        } else if (s->mv_type == MV_TYPE_16x16) {
            motion_x = s->mv[0][0][0];
            motion_y = s->mv[0][0][1];
        } else /*if (s->mv_type == MV_TYPE_FIELD)*/ {
            int i;
            motion_x = s->mv[0][0][0] + s->mv[0][1][0];
            motion_y = s->mv[0][0][1] + s->mv[0][1][1];
            motion_x = (motion_x>>1) | (motion_x&1);
            for(i=0; i<2; i++){
                s->p_field_mv_table[i][0][mb_xy][0]= s->mv[0][i][0];
                s->p_field_mv_table[i][0][mb_xy][1]= s->mv[0][i][1];
            }
            s->current_picture.ref_index[0][4*mb_xy    ]=
            s->current_picture.ref_index[0][4*mb_xy + 1]= s->field_select[0][0];
            s->current_picture.ref_index[0][4*mb_xy + 2]=
            s->current_picture.ref_index[0][4*mb_xy + 3]= s->field_select[0][1];
        }
        /* no update if 8x8 because it has been done during parsing */
        s->current_picture.motion_val[0][xy][0] = motion_x;
        s->current_picture.motion_val[0][xy][1] = motion_y;
        s->current_picture.motion_val[0][xy + 1][0] = motion_x;
        s->current_picture.motion_val[0][xy + 1][1] = motion_y;
        s->current_picture.motion_val[0][xy + wrap][0] = motion_x;
        s->current_picture.motion_val[0][xy + wrap][1] = motion_y;
        s->current_picture.motion_val[0][xy + 1 + wrap][0] = motion_x;
        s->current_picture.motion_val[0][xy + 1 + wrap][1] = motion_y;
        if(s->avctx->debug_mv) {
```

EXHIBIT I - EXEMPLARY COMPUTER CODE
© Copyright 2014 Brain Corporation. All rights reserved

```
            for (int i=0;i<2*block_size;i++) memset(s->dest[0] + i * s->linesize, 120 + s-
>current_picture.key_frame * 5, 2*block_size);
            for (int i=0;i<block_size;i++) memset(s->dest[1] + i * s->uvlinesize, 128 + motion_x,
block_size);
            for (int i=0;i<block_size;i++) memset(s->dest[2] + i * s->uvlinesize, 128 + motion_y,
block_size);
        }
    } else {
        if(s->avctx->debug_mv) {
            for (int i=0;i<block_size*2;i++) memset(s->dest[0] + i * s->linesize, 130, block_size*2);
            for (int ywrap=0, y=0;y<2;ywrap+=wrap,y++) {
                for (int x=0;x<2;x++) {
                    motion_x = s->current_picture.motion_val[0][xy + x + ywrap][0];
                    motion_y = s->current_picture.motion_val[0][xy + x + ywrap][1];
                    for (int i=0;i<block_size/2;i++) memset(s->dest[1] + x*block_size/2 + (i +
y*block_size/2) * s->uvlinesize, 128 + motion_x, block_size/2);
                    for (int i=0;i<block_size/2;i++) memset(s->dest[2] + x*block_size/2 + (i +
y*block_size/2) * s->uvlinesize, 128 + motion_y, block_size/2);
                }
            }
        }
    }
    if(s->encoding){ //FIXME encoding MUST be cleaned up
        if (s->mv_type == MV_TYPE_8x8)
            s->current_picture.mb_type[mb_xy]= MB_TYPE_L0 | MB_TYPE_8x8;
        else if(s->mb_intra)
            s->current_picture.mb_type[mb_xy]= MB_TYPE_INTRA;
        else
            s->current_picture.mb_type[mb_xy]= MB_TYPE_L0 | MB_TYPE_16x16;
    }
}
```

What is claimed is:

1. A video processing device of a robotic apparatus, comprising:
a camera configured to generate a compressed video frame;
an input interface coupled to the camera and configured to receive the compressed video frame;
a video encoder configured to:
determine information associated with a portion of the compressed frame, the information corresponding to motion of one or more objects within the compressed frame;
evaluate the information for a pattern, the pattern comprising a temporal sequence of a first group of motion vectors and a subsequent second group of motion vectors; and
identify the one or more objects based at least in part on a salient feature in the pattern within the information and based on a determination that a residual motion vector associated with the portion of the compressed frame breaches a velocity threshold, the residual motion vector being derived relative to a prevailing motion vector within the portion of the compressed frame;
an output interface configured to communicate an indication based on the identification of the one or more objects;
wherein;
the one or more objects identified in the compressed frame correspond to a physical task of the robotic apparatus; and
the indication is configured to modify a trajectory of the robotic apparatus based on the identified one or more objects.

2. The device of claim 1, wherein:
the compressed frame is produced by the video encoder comprising a motion estimator configured to provide the motion information;
the compressed frame comprises a plurality of blocks;
the information for a given block is determined by the video encoder based on an evaluation of the block and one other block associated with a preceding compressed frame; and
the information for the given block comprises first and second components.

3. The device of claim 2, wherein:
the preceding compressed frame and the compressed frame comprise representations of a feature;
the indication is configured based on identifying that the pattern is present in the information;
the portion of the compressed frame comprises the given block;
the first and the second components comprise horizontal displacement and vertical displacement of the feature between the preceding compressed frame and the compressed frame.

4. The device of claim 3, wherein:
the video encoder is selected from the group consisting of MPEG-4, H.262, H.263, H.264, and H.265 encoder; and
the video encoder is configured to compress live video in real-time.

5. The device of claim 4, wherein:
the compressed frame comprises a rectangular array of pixels; and
horizontal dimension and vertical dimension of the block are each set by the encoder at 8×8 pixels or 16×16 pixels.

6. The device of claim 3, wherein:
the determination of the information comprises:
  extraction of a motion vector for individual blocks of the compressed frame, the motion vector characterized by horizontal displacement and vertical displacement components, the horizontal displacement and the vertical displacement components stored as the chromaticity channels; and
  transformation of the motion vector into a three channel image frame representation comprised of a luminosity channel, a first chromaticity channel and a second chromaticity channel;
  wherein the identification of the pattern comprises access of the three channel image frame representation to obtain the horizontal and the vertical displacement components for one or more individual blocks within the portion.

7. The device of claim 1, wherein:
the pattern is characterized one or more of area, shape, and velocity; and
the indication is configured based on the evaluation indicating an absence of the pattern in the information.

8. The device of claim 1, wherein:
the indication is configured based on a presence of the pattern;
individual block of the plurality of blocks is characterized by a block motion vector;
the motion estimation operation comprises determination of a plurality of motion vectors associated with individual blocks of the plurality of blocks; and
an occurrence of a feature is determined based on an evaluation of one or more motion vector associated with individual blocks within the portion of the plurality of blocks.

9. The device of claim 1, wherein the video encoder is further configured to:
characterize an individual block of the plurality of blocks by a block motion vector; and
determine an occurrence of a feature based on an evaluation of one or more motion vector associated with individual blocks within the portion of the plurality of blocks;
wherein:
  the compressed frame is encoded using an encoder comprising a motion estimation operation performed on individual frames of the sequence of frames: and
  the motion estimation operation comprises determination of a plurality of motion vectors associated with individual blocks of the plurality of blocks.

10. The device of claim 1, wherein:
the portion of the compressed frame comprises a representation of a person's body,
the logic component is further adapted to determine motion information associated with another portion of the compressed frame conveying information amount surroundings of the person; and
the identification of the pattern comprises evaluation of the first motion characteristic associated with the portion and a second motion characteristic associated with the another portion.

11. The device of claim 10, wherein:
the pattern is characterized by a velocity threshold;
the portion comprises a first plurality of blocks characterized by a first plurality of motion vectors;
the another portion comprises a second plurality of blocks characterized by a second plurality of motion vectors;
the first motion characteristic is configured based on an operation on the first plurality of motion vectors;
the second 'motion characteristic is configured based on an operation on the second plurality of motion vectors;
the evaluation comprises determination of residual motion associated with the first plurality of blocks configured based on the first motion and the second motion characteristic; and
the pattern identification is configured based on the residual motion breaching the velocity threshold.

12. The device of claim 11, wherein:
the first plurality of motion vectors are configured to convey motion of the body;
the second plurality of motion vectors are configured to convey motion of the surroundings; and
the pattern comprises a gesture by the person.

13. A method of operating a video encoder apparatus, the apparatus configured to compress a raw frame of real-time video into a compressed frame, the method comprising:
causing the encoder apparatus to produce the compressed frame;
parsing the compressed frame, the parsing configured to provide information associated with the compressed frame, the information corresponding to motion of an object in the raw frame, the information comprising a plurality of components;
evaluating the information to determine a presence of the object within the raw frame, the determination of the presence of the object being based on a determination, based on at least one statistical parameter, of at least one residual motion vector derived from at least one dominant motion vector within the compressed frame, the determination of the presence of the object being further based on a determination that the derived at least one residual motion vector breaches a velocity threshold; and
providing an indication of the presence of the object based on the evaluation.

14. The method claim 13, wherein:
the real time video is provided by a video sensor disposed on the robotic device; and
the indication is configured to cause the robotic device to execute an action.

15. The method claim 13, wherein:
the encoder apparatus comprises a hardware component;
the real time video is provided by a video sensor disposed on a robotic device and configured to provide information related to environment of the device; and
the indication is configured to cause the robotic device to execute one of an a object approach or Object avoidance action.

16. The method of claim 15, wherein:
the encoded frame comprises a plurality of blocks, individual ones of the plurality of blocks being characterized by a motion vector;
the evaluation of the information comprises determination of the motion vector; and
the occurrence of a feature is determined based on an evaluation of the motion vector and one other motion vector associated with another block of the plurality of blocks.

17. The method of claim 15, wherein:
the encoded frame comprises a plurality of blocks, individual ones of the plurality of blocks being characterized by a motion vector;

the plurality of blocks comprises a first portion of blocks characterized by a first motion vector, and a second portion characterized by a second motion vector; and the evaluation of the information comprises a statistical operation configured based on the first motion vector and the second motion vector.

18. The method of claim 15, wherein:

the encoded frame comprises a plurality of blocks, individual ones of the plurality of blocks being characterized by a motion vector;

the plurality of blocks comprises a first portion of blocks characterized by a first motion vector, and a second portion characterized by a second motion vector; and the evaluation of the information comprises determining a first extent within the frame associated with the first portion, and a second extent within the frame associated with the second portion, using a clustering operation on a plurality of motion vectors associated with the plurality of blocks, the plurality of the motion vectors comprising the first and the second motion vectors.

19. The method of claim 15, wherein:

the robotic device comprises a battery operated vehicle; and parsing the compressed frame and evaluating the information cooperate to reduce energy used associated with detection of the object compared to object detection configured based on the raw video.

20. The method of claim 15, wherein the robotic device comprises a computerized appliance comprising a processing component configured to effectuate the parsing the compressed frame and the evaluating the information;

detection of the object based on the information obtained from the compressed frame is configured to reduce computational load of the processing component when compared to object detection configured based on the raw video.

21. The method of claim 18, wherein:

the first motion vector is configured based on self-motion of the robotic device;

the second motion vector is configured based on a motion of the object within the environment;

the first motion vector is greater than the second motion vector; and the evaluation comprises determining residual motion within the frame based on a removal of motion vectors of the first portion of blocks.

22. A method of processing raw video to efficiently detect objects present therein, the method comprising:

compressing the raw video according to a compression algorithm to produce compressed video;

parsing at least a portion of the compressed video to obtain information corresponding to motion of a moving object, the information comprising a map of pixel groups of the at least the portion of the compressed video, the map of pixel groups comprising a distribution of at least (i) a first plurality of the pixel groups having corresponding first motion vectors and (ii) a second plurality of the pixel groups having corresponding second motion vectors, the first motion vectors and the second motion vectors being different in location and direction; and evaluating the information associated with the first plurality and the second plurality of pixel groups of the at least the portion of the parsed compressed video to identify the moving object therein, the evaluating the information associated with the first and second plurality of pixel groups to identify the moving object further comprising, evaluating a respective rate of change of motion within the first plurality and the second plurality of pixel groups, and determining that at least one residual motion vector within the map of pixel groups breaches a velocity threshold.

23. A non-transitory computer-readable storage medium having computer readable instructions stored thereon, the instructions being executable by at least one processor to cause a video encoder apparatus to:

produce a compressed frame;

parse the compressed frame, the parse being configured to provide information associated with the compressed frame and corresponding to motion of one or more objects in the compressed frame, the information comprising a plurality of components;

evaluate the information to determine a presence of the one or more objects in the compressed frame, the determination of the presence of the one or more objects being based on (i) a determination, based on at least one statistical parameter, of a residual motion vector derived from a dominant vector in the compressed frame, and (ii) a determination that the derived residual motion vector breaches a velocity threshold; and provide an indication of the presence of the one or more objects based on the evaluation.

* * * * *